W. R. ANTHONY.
SHAPER FOR SWAGED SAW TEETH.
APPLICATION FILED MAY 9, 1908.
935,138.
Patented Sept. 28, 1909.
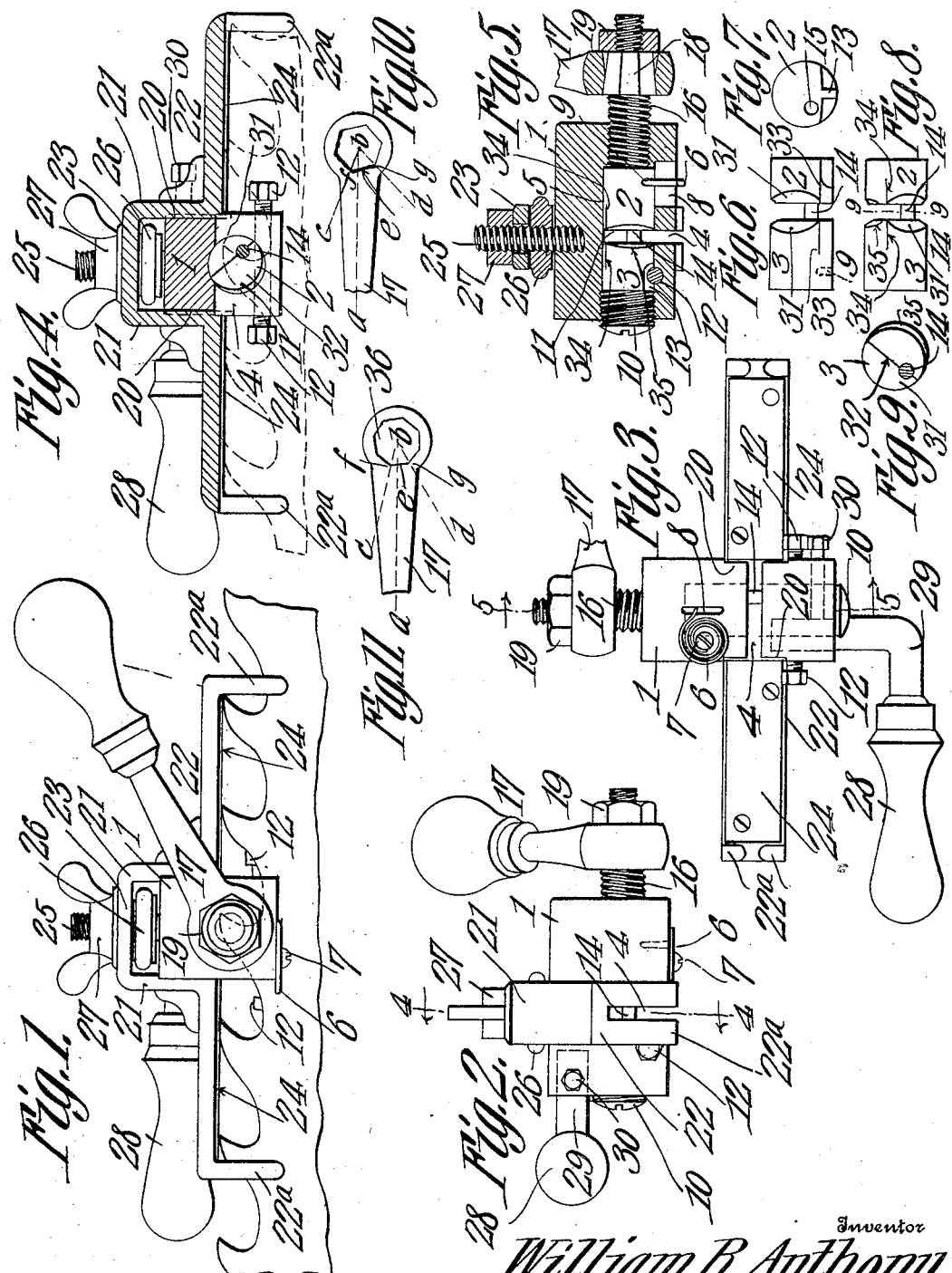
Witnesses
Inventor
William R. Anthony.
By C. A. Snow & Co.
Attorneys

UNITED STATES PATENT OFFICE.

WILLIAM RICHARD ANTHONY, OF MEMPHIS, TENNESSEE.

SHAPER FOR SWAGED SAW-TEETH.

935,138.  Specification of Letters Patent.  Patented Sept. 28, 1909.

Application filed May 9, 1908. Serial No. 431,947.

*To all whom it may concern:*

Be it known that I, WILLIAM R. ANTHONY, a citizen of the United States, residing at Memphis, in the county of Shelby and State of Tennessee, have invented a new and useful Shaper for Swaged Saw-Teeth, of which the following is a specification.

This invention relates to shapers for swaged saw teeth, and has for an object to provide a tool for side dressing the swaged points of saw teeth by applying pressure simultaneously on each side of a tooth, thereby producing a durable keen cutting side dress that insures smooth, straight and rapid sawing and an economical use of power.

Another object of the invention pertains to its simplicity of construction combined with strength and a minimum number of detachable parts, whereby speed and ease of operation and great efficiency are obtained.

A further object of the invention applies to the easy adjustability of its parts to all conditions of saws and shapes of teeth for correcting irregularities therein and, by compression, change the uneven sides of swaged teeth into correct and uniform shape giving strength to the sharp corners and just the proper clearance necessary for rapid work.

With these and other objects in view the invention consists of the novel construction, combination and arrangement of parts hereinafter described and claimed, and illustrated in the accompanying drawing in which;

Figure 1 is a view in elevation of the right side of the tool complete; Fig. 2 a rear end view; Fig. 3 a bottom plan view; Fig. 4 a vertical longitudinal sectional view of the tool on the line 4—4 of Fig. 2; Fig. 5 a central transverse sectional view on the line 5—5 of Fig. 3; Fig. 6 a detail view in elevation of the swaging dies, enlarged; Fig. 7 an end view of the relatively fixed die; Fig. 8 a top plan view of the two swaging dies; Fig. 9 a sectional view on the line 9—9 of Fig. 8, and Figs. 10 and 11 side views of portions of two forms of the die operating handle.

Similar reference numerals are used for the same parts in all the figures.

Referring to the drawings, the numeral 1 indicates the body of the tool in which are carried the swaging dies 2 and 3, said body comprising a block of steel or other hard, strong material provided with a narrow slot 4 in its under side extending from the front to the rear thereof and reaching about one-half the height of the block, through which slot the saw teeth pass while being shaped. A cylindrical socket 5 in the lower half of the body extends perpendicularly across the slot 4 and open at one end to receive the movable swaging die 2, and the relatively fixed swaging die 3.

The movable die 2 abuts at its outer end, when inoperative, against the bottom of the socket 5, it being retained in this position by a spring 6, here represented as a helical spring, fastened at one end to the bottom of the block by a screw or bolt 7, and having its free end bent upwardly and extending through a longitudinal slot 8, in the body 1 into a notch 9 made in the under side of the die 6. The relatively fixed die 3 is prevented from moving axially except when adjusted by a screw plug 10 threaded into the open end of the cylindrical socket 5, which plug serves as an abutment for the outer end of the die 3. The screw plug 10 when turned in the proper direction pushes the die 3 into the slot 4. This is necessary to keep the face of the die properly positioned in the slot, as the face is worn away when reground. The inner end or working face 11 of the movable die 2 is substantially flush with the wall of the slot on that side when the die is in normal position, but can be moved axially across the slot by means hereinafter described. The dies 2 and 3, connected by a pin 14 are adjusted to the pitch of saw teeth by rotating two horizontally disposed bolts 12 threaded into the body from front and rear, and abutting against a tongue 13 formed on the bottom of the die 3 at its outer end by cutting away the material of the die on each side. The inner ends of the bolts 12 bear constantly on the tongue and hold the die 3 securely in adjusted position. The pin 14 is slidably mounted in openings 15 in the two dies and extends parallel to their common axis across the slot 4 to form a stop or abutment for the saw teeth; to hold the movable die 2 in fixed relation to the die 3 when the die 2 is moved endwise, and to cause the movable die 2 to turn in unison with the relatively fixed die 3 when the latter is adjusted by the bolts 12 to the pitch of the saw teeth.

Threaded into the end of the body or block 1 opposite the screw plug 10 is a screw stem 16 its end operatively engaged against the outer end of the movable die 2 to force it toward the die 3 when turned by a handle 17 fitted on a polygonal head 18 on the outer end of said threaded stem and held in place thereon by a nut 19 screwed on a reduced portion of said stem outside the polygonal head.

In the front and rear sides, respectively, of the body or block 1 is formed a shallow recess 20 extending from the top of the block downwardly below the top of the saw groove 4 and laterally on each side of the same, in which recesses are snugly seated the upright members 21 of a supporting frame 22 which guide the body 1 as it is moved vertically. The supporting frame 22 comprises a straight flat bar with a central arch of which 21 are the side members and 23 the top connecting member. At each end, the supporting frame is provided with two laterally spaced downwardly projecting fingers 22ª which straddle the saw teeth and guide the tool in the course of operation. To resist the wear of the saw teeth, hardened steel plates 24 are secured to the under side of the supporting frame 22 in a detachable manner so that they can be removed for trueing when worn by use.

Fixed in the top of the body 1 is a vertically disposed screw stud bolt 25 which passes freely through a hole in the connecting member 23 of the supporting frame 22, on which a knurled edged thumb nut 26 is threaded below the connecting member 23, and a wing nut 27 is screwed on the same above said connecting member. By means of these two nuts the body 1, carrying the shaping dies 2 and 3, is raised and lowered in the supporting frame to accommodate the width of the swaged points of saw teeth, and be locked securely when the proper position has been obtained.

The tool is manipulated by a handle 28 on the left thereof parallel to the supporting frame 22, and attached to the body by means of an L-shaped shank 29 fitted into a socket bored in the left side of said body or block and secured rigidly therein by a bolt 30.

The operating or shaping faces 11 of the dies 2 and 3 are perpendicular to their common axis and situated on opposite sides of the saw slot 4 as previously described. One side 31 of each die face 11 is beveled from a straight line 32 running diagonally across said face as shown, the intersections of said line with the periphery of the die being indicated on the side of said die by lines 33 and 34. The beveled surfaces 31 are on the upper and forward sides of the two die faces 11 and in such position that the line or angle 32 determines or limits the lateral angular spread or set of the saw teeth points. Opposite the beveled surfaces 31, the outer edges of the two die faces are chamfered as at 35 to permit the saw teeth entering easily between the dies into position for shaping without damaging the swaged cutting edges of the teeth.

The polygonal head 18 on the screw stem 16 which operates the movable die 2 may be hexagonal, octagonal or have any other number of sides desired, and is preferably tapered outwardly, as shown in Fig. 5. The handle 17, which turns the screw stem is as thick at the eye end as said head is wide and has its polygonal eye 36 tapered from both sides of the handle toward the center, thus enabling it to be placed on the head from either side which, owing to the particular angular relation the sides of the eye bear toward the longitudinal axis of the handle, enables the handle to be placed on the head in twice as many positions as there are sides to the head 18 and eye 36. This is accomplished in the manner represented in Figs. 10 and 11, Fig. 10 showing a handle with a hexagonal eye and Fig. 11 one with an eye of octagonal shape. As there shown the axis of each handle passes through the center of its eye on the line $a, b$. The angle $c, b, d$, Fig. 10 is equal to sixty degrees, therefore the chord $e$, of its included arc $f, g$, forms one side of the hexagonal eye 36. This chord $e$, is disposed at such an angle to the axis $a, b$, that the angle $c, b, d$, is divided by said axis into two unequal angles one $a, b, c$, of fifteen degrees, and the other $a, b, d$, of forty-five degrees, or one-fourth and three-fourths, respectively, of the angle $c, b, d$. An octagonal or other shaped eye will have its sides so disposed that the angle $c, b, d$, including one of its sides will be divided by the axis $a, b$, into like proportional parts. From this it will be clear that if the head 18 happens to be for example hexagonal and in such position that an angle or corner thereof be vertically above its center, and the handle 17 placed on the head so that the line $c, b$, passed vertically through said corner, the axis $a, b$, of the handle will form an angle of fifteen degrees with $c, b$, or one fourth that of $c, b, d$, while if the handle be turned over and its opposite side placed next the tool so that $d, b$, will pass vertically through the aforesaid corner, the axis $a, b$, will form an angle therewith of forty five degrees or three fourths that of $c, b, d$.

Deducting the angle $a, b, c$, fifteen degrees, the angle of the first position of the handle from the angle $a, b, d$, forty five degrees, the angle of the second position of the handle leaves an angle of thirty degrees or one twelfth of a circle, thus giving twelve angular positions for the handle with a hexagonal eye. A similar application of this principal to other polygonal forms will give twice as many angular positions for the handle as the eye has sides.

To operate the tool, the body or block 1 is first adjusted vertically by the nuts 26 and 27 and the dies 2 and 3 angularly set by the bolts 12 to the pitch of the saw teeth to be shaped. The saw being secured with its teeth uppermost, the handle 28 is grasped by the left hand and placed over the saw, the teeth of which enter the groove 4 of the body and between the fingers 22ª until the hardened plates 24 of the supporting frame 22 rest on the points of the teeth. The tool is then drawn rearwardly until the pin 14, across the groove 4 strikes the under side of a tooth and arrests the tool. The handle 17 is now seized and drawn rearwardly, it having been previously set at the proper angle in the manner hereinabove explained, turning the screw stem 16 which moves inwardly and forces the movable die 2 against the saw tooth and the latter against the relatively fixed die 3. Continued movement of the handle 17 presses the swaged point of the tooth between the dies with sufficient power to correct any irregularity therein, change the uneven sides caused by swaging and bring the tooth to a correct and uniform shape and proper clearance. After shaping the tooth the handle 17 is pushed forward to back the screw stem 16 and permit the movable die to retract under the force of the spring 6. The tool is then pushed forward to the next tooth and the operation repeated as rapidly as the operator can work the lever or handle 17.

What is claimed is:—

1. A shaper for swaged saw teeth comprising a supporting frame, a grooved block or body carried in said frame, opposing dies having like beveled faces opening into the groove in said body, one of which dies is movable, means for operating said movable die, and means for rotatably adjusting said dies in said body.

2. A shaper for swaged saw teeth comprising a supporting frame, a grooved body carried in said frame, a relatively fixed die and a longitudinally movable die having a common axis perpendicular to the groove in said body, said dies having like beveled faces, a slidable connection between said dies across said groove, means acting directly on said relatively fixed die for rotatably adjusting both of said dies in said body, and means for operating the movable die.

3. A tool of the character described having a grooved body provided with a relatively fixed die and a movable die on a common axis perpendicular to the groove in said body and disposed on opposite sides thereof with opposed like beveled faces, a slidable connection between the two dies, means for rotatably adjusting said relatively fixed die and through said slidable connection the movable die, means for advancing the movable die, and separate means for retracting the same.

4. A tool of the character described comprising a grooved body, a relatively fixed die and a longitudinally movable die carried by said body in the same axial line perpendicular to said groove, said dies having like beveled faces, a slidable connection between said dies, means for advancing the movable die toward the fixed die, and means for rotatably adjusting said dies.

5. A tool of the character described comprising a supporting frame having a central arch, a slotted body vertically movable in said arch, means for adjusting said body in said arch and locking it fast after adjustment, guide fingers depending from the ends of the supporting frame and shaping dies carried by said body.

6. A tool of the character described comprising a body grooved on its under side and having a cylindrical socket perpendicular to and crossing said groove, a movable die on one side of said groove and a relatively fixed die on the opposite side thereof, said dies having like parallel opposing faces each beveled on one side, and chamfered at the edge opposite said side, a slidable connecting means between the two dies and crossing said groove, and independent means for operating said movable die in opposite directions.

In testimony that I claim the foregoing as my own, I have hereto affixed my signature in the presence of two witnesses.

WILLIAM RICHARD ANTHONY.

Witnesses:
L. D. GUTHRIE,
W. R. SIMS.